(No Model.)
W. J. O. ASTRUP.
GRASS CATCHING ATTACHMENT FOR LAWN MOWERS.
No. 485,599.  Patented Nov. 8, 1892.
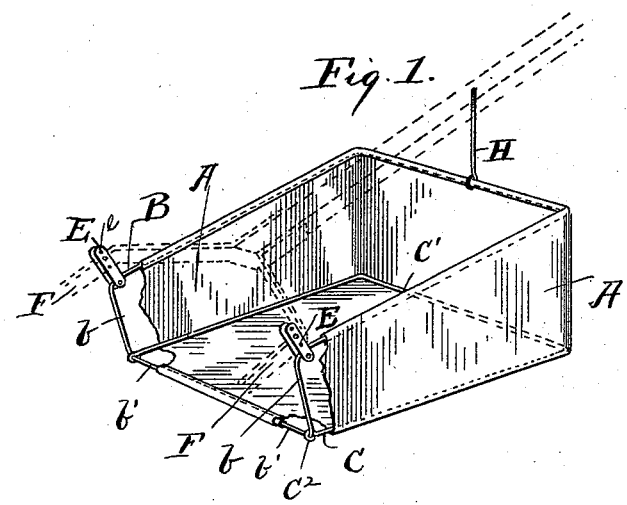
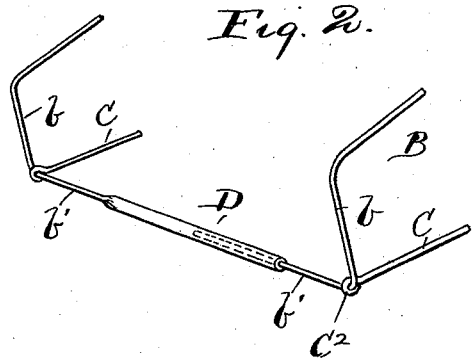
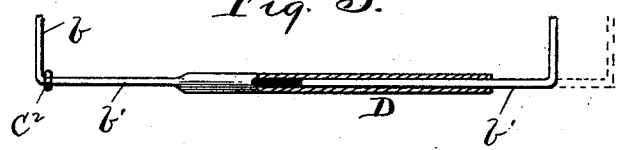
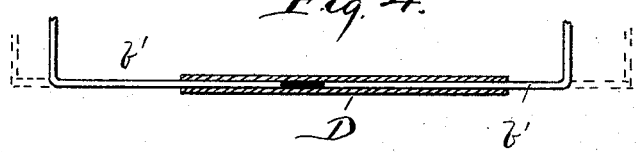
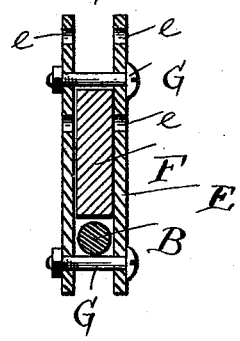
Witnesses.
E. B. Gilchrist.
C. N. Dorer
Inventor,
William J. O. Astrup
By Leggett & Leggett
his Attorneys.

UNITED STATES PATENT OFFICE.

WILLIAM J. O. ASTRUP, OF CLEVELAND, OHIO.

GRASS-CATCHING ATTACHMENT FOR LAWN-MOWERS.

SPECIFICATION forming part of Letters Patent No. 485,599, dated November 8, 1892.

Application filed April 28, 1892. Serial No. 430,980. (No model.)

*To all whom it may concern:*

Be it known that I, WILLIAM J. O. ASTRUP, of Cleveland, in the county of Cuyahoga and State of Ohio, have invented certain new and useful Improvements in Grass-Catching Attachments for Lawn-Mowers; and I do hereby declare the following to be a full, clear, and exact description of the invention, such as will enable others skilled in the art to which it pertains to make and use the same.

My invention relates to improvements in grass-catching attachments for lawn-mowers; and it consists in certain features of construction and in combination of parts hereinafter described, and pointed out in the claims, the object being to provide a grass-catcher that is readily adjustable to different sizes of lawn-mowers, that is durable, simple in construction, and comparatively inexpensive.

In the accompanying drawings, Figure 1 is a view in perspective of a grass-catching attachment embodying my invention, portions being broken away to more clearly show the construction, and the handle-yoke of the lawn-mower, to which the attachment is connected, being shown in dotted lines. Figs. 2, 3, 4, and 5 are details, partly in section, more clearly exhibiting certain features of the construction.

My improved grass-catching attachment comprises a grass receiver or receptacle A, made, preferably, of canvas.

B and C represent the supporting-frames of said receptacle, the same being made, preferably, of a single piece of wire, respectively, and the upper frame B being hemmed in the canvas of the receptacle. Frames B and C are substantially U-shaped, as shown, and the lower frame C is secured to the canvas or material of the grass-receiver, preferably by stitching to the canvas the central member C' of said frame at the rear of the receptacle. Upper frame B at each side of the front of the receptacle is bent downward, as at $b$, and then inward, as at $b'$, and the side members of lower frame C terminate at their forward ends, respectively, in an eye or loop $C^2$, (see Fig. 2,) that embraces the respective inwardly-extending member $b'$ of the upper frame at the lower end of the respective downwardly-bent member $b$, thereby securely connecting the two frames with each other. Inwardly-extending members $b'$ of upper frame B are preferably inclosed in a hem in the canvas or material of which the bottom of the receptacle is made; but to protect the canvas or material from being cut or torn by the free ends of inwardly-extending members $b'$ and to give rigidity to the frame a tubular member or sleeve D is provided that may either loosely embrace and inclose the free ends of members $b'$, as shown in Fig. 4, or said tubular member, as shown in Figs. 2 and 3, may be soldered or otherwise secured to the end of one of said inwardly-extending members $b'$ and inclose the free end of the other member $b'$. That shown in Fig. 3 is the preferred construction. Tubular member or sleeve D is of such length that it will accommodate the widthwise adjustment of the grass receiver or receptacle to different sizes of lawn-mowers.

Another feature in the construction of my improved lawn-mower attachment consists in the simple means employed for attaching the grass receiver or receptacle to the handle-yoke of the lawn-mower. As shown in Fig. 1 and more clearly in Fig. 5, the means employed comprises a pair of plates or straps E, provided at each side of the forward end of the grass-receiver, the members of a pair of plates or straps E being located at opposite sides of the respective side member F of the handle-yoke and side member of upper frame B and are securely connected with each other by means of a pair of bolts G, the one bolt passing just above the respective side member of the handle-yoke and the other bolt just below said member and the respective side member of frame B, said plates or straps being provided with holes $e$ for the passage of said bolts and being preferably provided with a series of such holes whereby to enable the vertical adjustment of the grass receiver or receptacle to accommodate the slight variation in the height and sizes of the handle-yokes of the different varieties of lawn-mowers.

H represents a hook that supports the grass-receptacle at the rear, the same depending from the handle of the lawn-mower, as shown.

What I claim is—

1. In a grass receiver or receptacle for lawn-mowers, upper and lower supporting-frames suitably connected with each other, the one frame at each side of the forward end of the receiver or receptacle being bent inward and the one of said inwardly-bent members terminating in a tubular member or sleeve adapted to inclose the free end of the other inwardly-bent member, substantially as and for the purpose set forth.

2. In a grass receiver or receptacle for lawn-mowers, upper and lower supporting-frames, the one frame terminating in eyes or loops embracing the other frame, and a tubular member or sleeve adjustable endwise, inclosing the free end or ends of the last-mentioned frame, substantially as and for the purpose set forth.

3. In a grass receiver or receptacle for lawn-mowers, upper and lower supporting-frames shaped substantially as shown, the lower frame at the forward end of the grass receiver or receptacle terminating in eyes or loops embracing the upper frame and one of the free ends of the upper frame terminating in a tubular member or sleeve adapted to inclose the other free end of said frame, substantially as and for the purpose set forth.

In testimony whereof I sign this specification, in the presence of two witnesses, this 4th day of April, 1892.

WILLIAM J. O. ASTRUP.

Witnesses:
C. H. DORER,
WARD HOOVER.